(12) United States Patent
Salenbien (10) Patent No.: US 10,821,857 B2
(45) Date of Patent: Nov. 3, 2020

(54) HINGE ASSEMBLY FOR VEHICLE SEAT

(71) Applicant: Ford Global Technologies, LLC, Dearborn, MI (US)

(72) Inventor: Nicholas Salenbien, Dundee, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 35 days.

(21) Appl. No.: 16/211,893

(22) Filed: Dec. 6, 2018

(65) Prior Publication Data
US 2020/0180476 A1   Jun. 11, 2020

(51) Int. Cl.
*B60N 2/30*   (2006.01)
*A47C 7/58*   (2006.01)
*A47C 7/56*   (2006.01)

(52) U.S. Cl.
CPC ............ *B60N 2/305* (2013.01); *A47C 7/58* (2013.01); *B60N 2/309* (2013.01); *A47C 7/56* (2013.01); *B60N 2/3031* (2013.01); *B60N 2/3065* (2013.01)

(58) Field of Classification Search
CPC ........ B60N 2/305; B60N 2/309; A47C 1/121; A47C 7/56; A47C 7/58
See application file for complete search history.

(56) References Cited

U.S. PATENT DOCUMENTS

| | | | |
|---|---|---|---|
| 2,926,948 A * | 3/1960 | Koplin | B60N 2/3065 296/66 |
| 3,189,312 A | 6/1965 | Bilancia | |
| 3,529,863 A * | 9/1970 | Belfry | B60N 2/305 296/66 |
| 4,475,763 A * | 10/1984 | Hamatani | B60N 2/3013 296/65.09 |
| 4,888,854 A | 12/1989 | Russell et al. | |
| 5,662,368 A * | 9/1997 | Ito | B60N 2/01583 296/65.05 |
| 5,795,023 A * | 8/1998 | Kayumi | B60N 2/3013 297/331 |
| 5,934,732 A * | 8/1999 | Jakubiec | B60N 2/3013 296/65.01 |
| 6,030,038 A * | 2/2000 | Namba | B60N 2/3013 297/257 |
| 6,155,639 A * | 12/2000 | Frolo | B60N 2/305 296/65.03 |
| 6,158,799 A * | 12/2000 | Guilford | B60N 2/01583 296/65.01 |
| 6,199,951 B1 * | 3/2001 | Zeile | B60N 2/3011 297/15 |

(Continued)

FOREIGN PATENT DOCUMENTS

| | | | |
|---|---|---|---|
| FR | 2738535 A1 | 3/1997 | |
| FR | 2939732 B1 * | 7/2014 | ........... B60N 2/3065 |
| JP | S57118938 A | 7/1982 | |

*Primary Examiner* — Syed A Islam
(74) *Attorney, Agent, or Firm* — David Coppiellie; Price Heneveld LLP (57) ABSTRACT

A vehicle seat hinge assembly includes a first pivoting member that defines a first axis and is coupled to a first bracket disposed on a vehicle floor. The hinge assembly also includes a second pivoting member that defines a second axis and is disposed on a seat. The first pivoting member is pivotable about the first axis between at least first and second positions. The second pivoting member is pivotable about the second axis between at least fixed and released positions.

20 Claims, 12 Drawing Sheets

(56) References Cited

U.S. PATENT DOCUMENTS

| | | | | |
|---|---|---|---|---|
| 6,827,394 | B2* | 12/2004 | Watanabe | B60N 2/206 296/63 |
| 6,877,807 | B2* | 4/2005 | Mizuno | B60N 2/305 297/188.08 |
| 6,932,409 | B2* | 8/2005 | Falchero | B60N 2/3011 296/65.01 |
| 7,063,385 | B2* | 6/2006 | Lee | B60N 2/305 296/65.05 |
| 7,246,857 | B2* | 7/2007 | Kim | B60N 2/3065 297/331 |
| 7,585,011 | B2* | 9/2009 | Kuroki | B60N 2/3011 296/65.09 |
| 7,597,375 | B2* | 10/2009 | Takatsura | B60N 2/22 296/65.08 |
| 7,686,389 | B2* | 3/2010 | Yamada | B60N 2/3013 297/15 |
| 8,590,970 | B2* | 11/2013 | Takakura | B60N 2/062 297/331 |
| 9,487,149 | B2* | 11/2016 | Shimada | B60R 7/043 |
| 9,738,184 | B2* | 8/2017 | Miyazawa | B60N 2/3065 |
| 9,758,070 | B1* | 9/2017 | Salenbien | B60N 2/305 |
| 9,987,953 | B2* | 6/2018 | Kimura | B60N 2/12 |
| 9,987,955 | B2* | 6/2018 | Ecker | B60N 2/0232 |
| 10,065,548 | B2* | 9/2018 | Dunn | B60N 2/3011 |
| 10,124,700 | B2* | 11/2018 | Jeong | B60N 2/919 |
| 10,173,556 | B2* | 1/2019 | Imayou | B60N 2/06 |
| 10,259,395 | B2* | 4/2019 | Salenbien | B60N 2/3013 |
| 10,336,262 | B2* | 7/2019 | Mozurkewich | B60N 2/42763 |
| 2003/0098592 | A1* | 5/2003 | Nygren | B60N 2/3013 296/65.09 |
| 2004/0150243 | A1* | 8/2004 | Epaud | B60N 2/3013 296/65.09 |
| 2009/0243357 | A1* | 10/2009 | Mori | B60N 2/30 297/325 |
| 2013/0001394 | A1* | 1/2013 | Calvert | B60N 2/3013 248/429 |
| 2017/0080831 | A1* | 3/2017 | Kaemmerer | B60N 2/0224 |

* cited by examiner

HINGE ASSEMBLY FOR VEHICLE SEAT

FIELD OF THE INVENTION

The present invention generally relates to a vehicle seating assembly, and more particularly to a hinge assembly for a vehicle seating assembly.

BACKGROUND OF THE INVENTION

Providing seating assembly designs that minimize unintended seating assembly movement may be desirable.

SUMMARY OF THE INVENTION

According to a first aspect of the present invention, a vehicle seat hinge assembly includes a first pivoting member that defines a first axis and is coupled to a first bracket disposed on a vehicle floor. The hinge assembly also includes a second pivoting member that defines a second axis and is disposed on a seat. The first pivoting member is pivotable about the first axis between at least first and second positions. The second pivoting member is pivotable about the second axis between at least fixed and released positions.

Embodiments of the first aspect of the invention can include any one or a combination of the following features:
the first pivoting member comprises a link having a first portion coupled to the first bracket;
the second pivoting member comprises a second bracket assembly;
the second pivoting member further comprises a retention assembly;
the retention assembly is selectively engageable with the link to position the second bracket assembly in the fixed position or the released position;
the link is U-shaped;
the retention assembly includes an extension member;
the extension member is positionable in a locked position or an unlocked position;
the locked position comprises an extended position;
the unlocked position comprises an extended position;
the hinge assembly includes an activation strap coupled to the extension member;
the extension member is spring biased toward an extended position;
the vehicle floor includes an inclined portion; and
the second bracket assembly is disposed in a recess in the seat.

According to a second aspect of the present invention, a hinge assembly for a vehicle seat includes first and second mounting mechanisms secured to a floor and a seat, respectively. A link extends between the first and second mounting mechanisms. The seat is rotatable about a second axis defined by the link and extends through the second mounting mechanism. The second mounting mechanism and the seat are rotatable about the second axis between fixed and released positions.

Embodiments of the second aspect of the invention can include any one or a combination of the following features:
the fixed position comprises a substantially horizontal position;
the released position comprises an inclined position;
a first axis defined by the link and extending though the first mounting mechanism, wherein when the second mounting mechanism and the seat are in the inclined position, then the second mounting mechanism and the seat may be rotated around the first axis to a substantially vertical position of the seat and the second mounting mechanism.

According to a third aspect of the present invention, a vehicle seat hinge assembly includes a linkage having a first portion pivotally coupled to a vehicle floor. A second portion is pivotally coupled to a vehicle seat. A retention assembly is coupled to the vehicle seat and is engageable with the linkage. The retention assembly is selectively positionable between locking and unlocking positions to retain the vehicle seat in respective fixed or released positions.

Embodiments of the third aspect of the invention can include any one or a combination of the following features:
the linkage is U-shaped.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
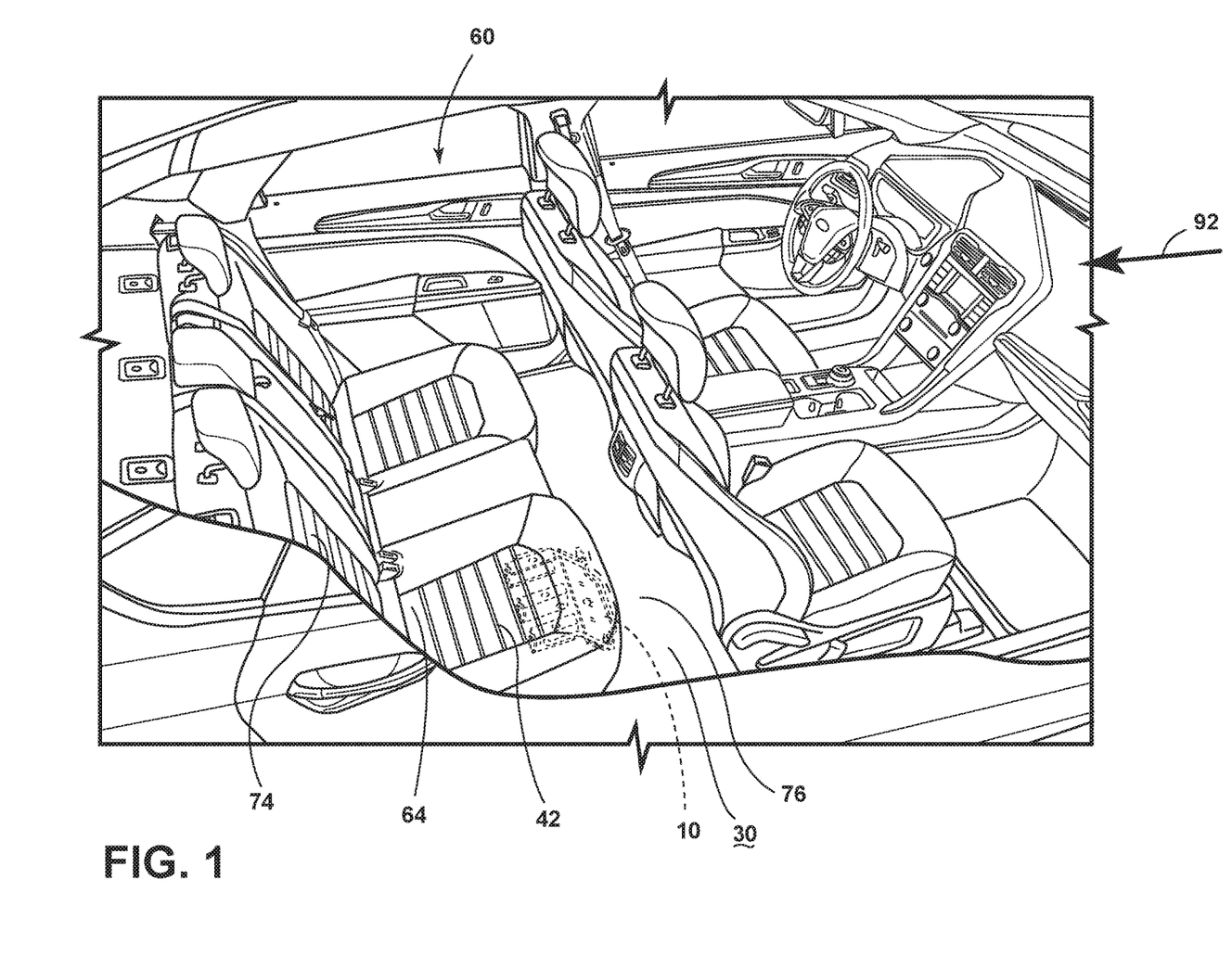
FIG. 1 is a perspective view of the interior of a vehicle cabin and showing a seat having a hinge assembly, according to an embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-19, a vehicle seat hinge assembly 10 includes a first pivoting member (link 14) and a second pivoting member (second bracket assembly 18). The first pivoting member (link 14) defines a first axis 22 and is coupled to a first bracket 26 disposed on a vehicle floor 30. The second pivoting member (second bracket assembly 18) defines a second axis 38 and is disposed on a seat 42. The first pivoting member (link 14) is pivotable about the first axis 22 between at least a first position I and a second position II. The second pivoting member (second bracket assembly 18) is pivotable about the second axis 38 between at least a fixed position X and a released position XI.

Referring to FIG. 1, an interior of a vehicle cabin 60 is shown. The vehicle cabin 60 may include a seating assembly 64. The seating assembly 64 may include a seat 42 and a seatback 74. A hinge assembly 10 may be disposed between the vehicle floor 30 and the seat 42. A hinge assembly 10 may allow the seat 42 to move between a substantially horizontal position XX (FIG. 5) and a substantially vertical position XXV (FIG. 8). In the substantially horizontal position XX (FIGS. 5, 10, 11), an individual 80 may sit on the seat 42. In the substantially vertical position XXV (FIGS. 8, 14), an individual 80 may store a suitcase 84 or other cargo item between the seatback 74 and the seat 42. The seat 42 may be positioned in intermediate positions XXI (FIGS. 6, 12) and XXII (FIGS. 7, 13) during movement between the substantially horizontal position XX and the substantially vertical position XXV. A retention assembly 88 (FIGS. 3, 3A, 4-8) may fix the seat 42 in the substantially horizontal position XX to restrain the seat 42 from rotating to the substantially vertical position XXV or another position in the event of a front dynamic impact (represented by arrow 92 in FIG. 1). An individual 80 may release the retention assembly 88 to facilitate movement of the seat 42 between the substantially horizontal position XX and the substantially vertical position XXV.

With continued reference to FIG. 1 and as previously explained, the discussion of the hinge assembly 10 herein refers to the hinge assembly 10 in the position shown in FIG. 1. The hinge assembly 10 may be described with reference to an individual 80 seated in seating assembly 64. See, FIG. 10. For example, the parts of the hinge assembly 10 to the right of a seated individual 80 may be referred to as "first." For example, the parts of the hinge assembly 10 to the left of a seated individual 80 may be referred to as "second."

Figure 2:
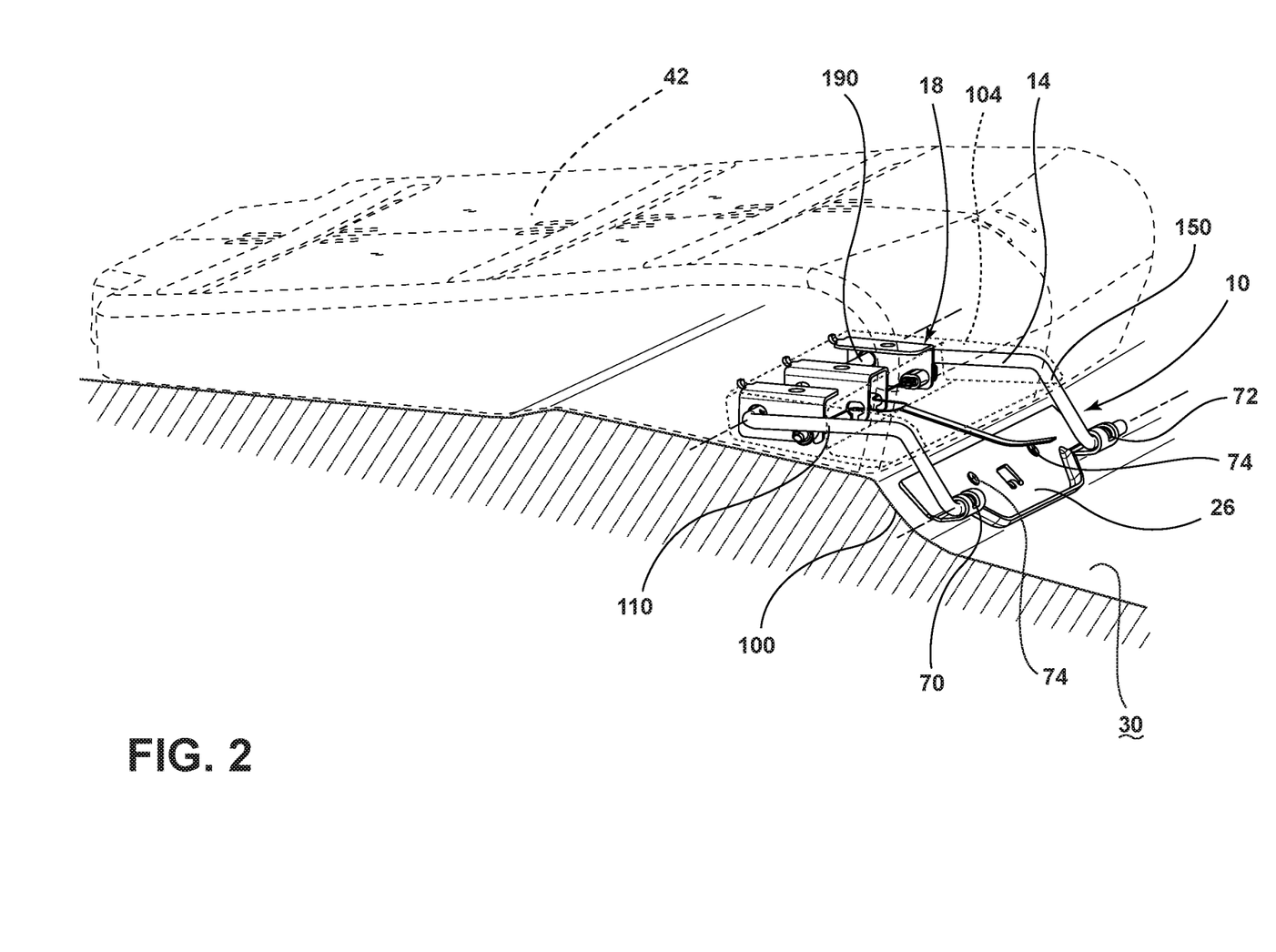
FIG. 2 is a front perspective view of the seat with a hinge assembly, according to an embodiment.

Referring to FIG. 2, the hinge assembly 10 is shown disposed on a vehicle floor 30 and coupled to a seat 42. The vehicle floor 30 may include an inclined portion 100. The hinge assembly 10 may be disposed on the inclined portion 100 of the vehicle floor 30. The hinge assembly 10 may include a link 14 that may be coupled to a first bracket 26 coupled to a vehicle floor 30 and a second bracket assembly 18 coupled to the vehicle seat 42. In various embodiments, link 14 may be U-shaped. The link 14 may include a first leg 110, a second leg 150, and a connection member 190 disposed between the first leg 110 and the second leg 150. As previously discussed, the first bracket 26 may be attached to the vehicle floor 30. In various embodiments, the first bracket 26 may be attached to another vehicle structure. The second bracket assembly 18 may be attached to the seat 42 with fasteners (not shown) that may be inserted in holes in the seat 42. The second bracket assembly 18 may include apertures (not shown) that may receive the connection member 190 of the link 14. The second bracket assembly 18 may be disposed in a recess 104 in the seat 42. As such, the hinge assembly 10 may be disposed between the seat 42 and the vehicle floor 30.

Figure 3:
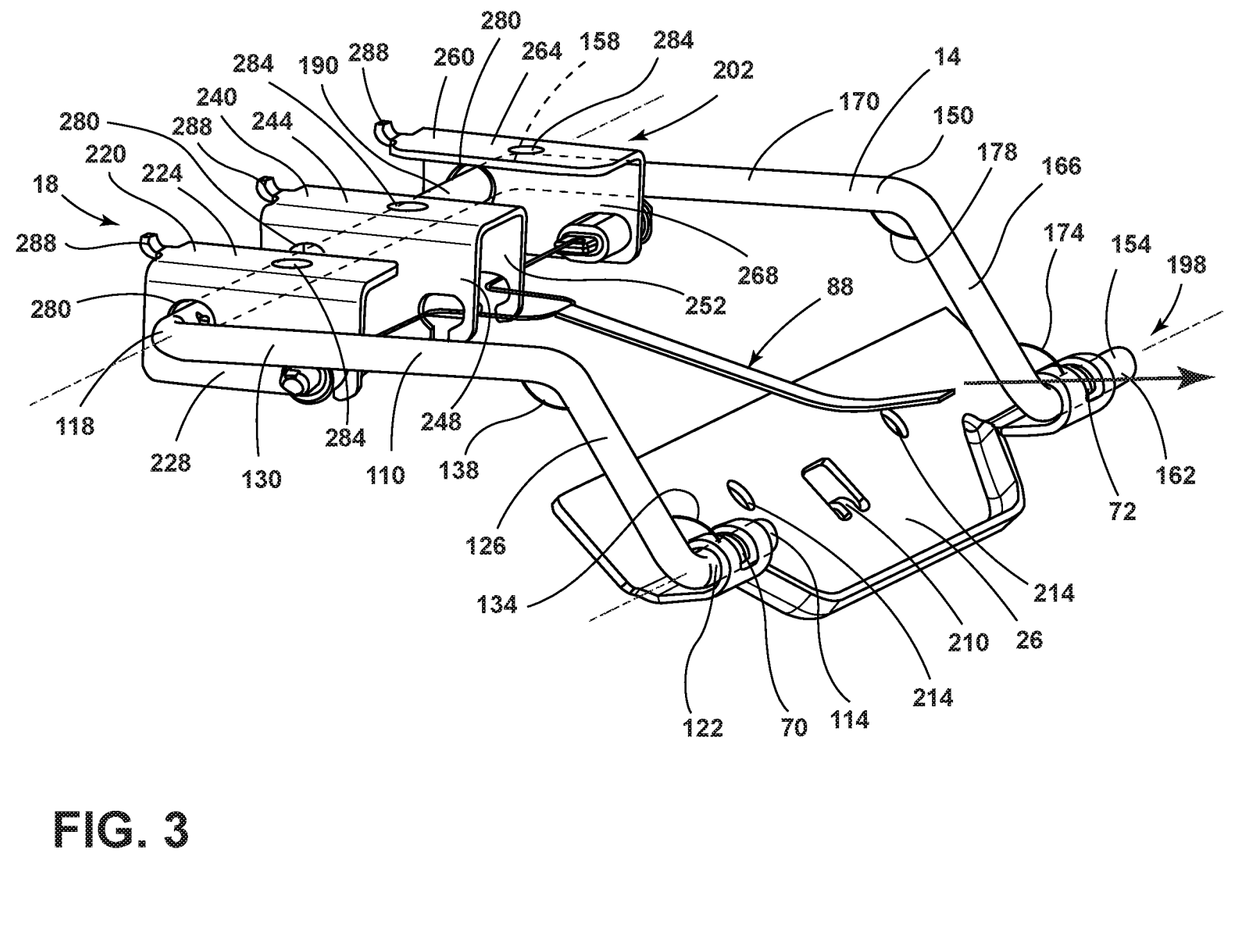
FIG. 3 is a front perspective view of the hinge assembly with extension members in extended positions, according to an embodiment.

With reference to FIG. 3, the link 14 may be described in greater detail. The first leg 110 may include a first end 114 coupled to the first bracket 26 and a second end 118 coupled to a connection member 190. The first leg 110 may include a first segment 122, a second segment 126, and a third segment 130. The first segment 122 may be disposed in a first cavity 70 of the first bracket 26. An orthogonal bend angle 134 may be disposed between the first segment 122 and the second segment 126. An obtuse bend angle 138 may be disposed between the second segment 126 and the third segment 130. The second end 118 of the first leg 110 may connect with the connection member 190. The second leg 150 may include a first end 154 coupled to a second cavity 72 of the first bracket 26 and a second end 158 coupled to a connection member 190. The second leg 150 may include a first segment 162, a second segment 166, and a third segment 170. The first segment 162 may be disposed in a second cavity 72 of the first bracket 26. An orthogonal bend angle 174 may be disposed between the first segment 162 and the second segment 166. An obtuse bend angle 178 may be disposed between the second segment 166 and the third segment 170. The second end 158 of the second leg 150 may connect with the connection member 190. The link 14 may be described as having a first portion 198 and a second portion 202. The first portion 198 of the link 14 may be proximate the first bracket 26. The second portion 202 of the link 14 may be proximate the second bracket assembly 18.

With continued reference to FIG. 3, the first bracket 26 and the second bracket assembly 18 may be described in greater detail. The first bracket 26 may be a stamped steel plate with upturned ends that may form first and second cavities 70, 72. The first bracket 26 may include a locating tab 210 for locating the first bracket 26 on a vehicle floor 30 or other vehicle structure. The first bracket 26 may also include apertures 214 for receiving fasteners (not shown) for attaching the first bracket 26 to a vehicle floor 30 or other vehicle structure. In the embodiment shown, the first bracket 26 may be designed for mounting on an inclined portion 100 of a vehicle floor 30. (FIG. 2) In various embodiments, the first bracket 26 may be designed for mounting on a horizontal vehicle floor or other surface. In various embodiments, the first bracket 26 may be designed for mounting on a vehicle floor 30 or other vehicle surface having a non-planar contour.

Figure 18:
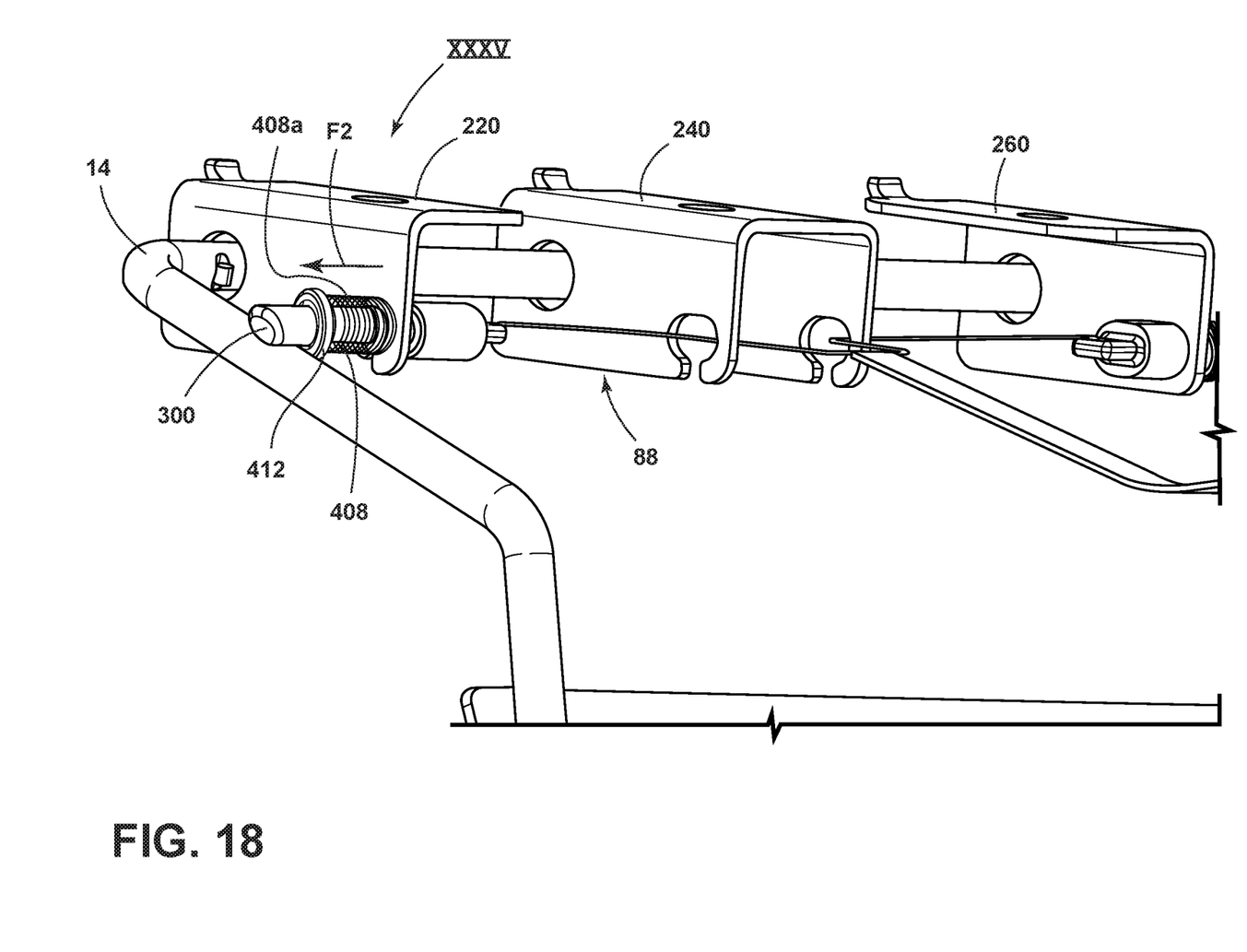
FIG. 18 is a perspective view of a first extension member of the retention assembly in an unlocking position, according to an embodiment.

With continued reference to FIG. 3, the second bracket assembly 18 may include a first part 220, a second part 240, and a third part 260. The first part 220 may include a top portion 224 and a side portion 228 that may be orthogonal to the top portion 224. The second part 240 may include a top portion 244, a first side portion 248 that may be orthogonal to the top portion 244, and a second side portion 252 that may be orthogonal to the top portion 244. The third part 260 may include a top portion 264 and a side portion 268 that may be orthogonal to the top portion 264. Each of the first, second, and third parts 220, 240, 260 may include a hole 280 for receiving a link 14. As further discussed below, each of the first, second, and third parts 220, 240, 260 may also be configured to receive the retention assembly 88. Each of the first, second, and third parts 220, 240, 260 may include a hole 284 for receiving a fastener for mounting the first, second, and third parts to a seat frame or a similar structure. Each of the first, second, and third parts 220, 240, 260 may include a locating tab 288 for positioning the first, second, and third parts 220, 240, 260 on a seat frame or a similar structure. In various embodiments, the second bracket assembly 18 may be a unitary part. In various embodiments of the second bracket assembly 18 as a unitary part, a unitary second bracket assembly may include first, second, and third portions that may be similar to the first, second, and third parts 220, 240, 260. A retention assembly 88 may be coupled to the second bracket assembly 18. The retention assembly 88 may be positioned in at least a locking position XXX (FIG. 15) and an unlocking position XXXV (FIG. 18). In the locking position XXX, the retention assembly 88 may limit movement of the seat 42 around the second pivot point defined by the second axis 38 during a front dynamic impact (as represented by arrow 92 in FIG. 1). In the unlocking position XXXV, the retention assembly 88 may allow for movement of the seat 42 and the second bracket assembly 18 around the second pivot defined by the second axis 38 during a front dynamic impact (as represented by arrow 92 in FIG. 1).

Figure 3A:
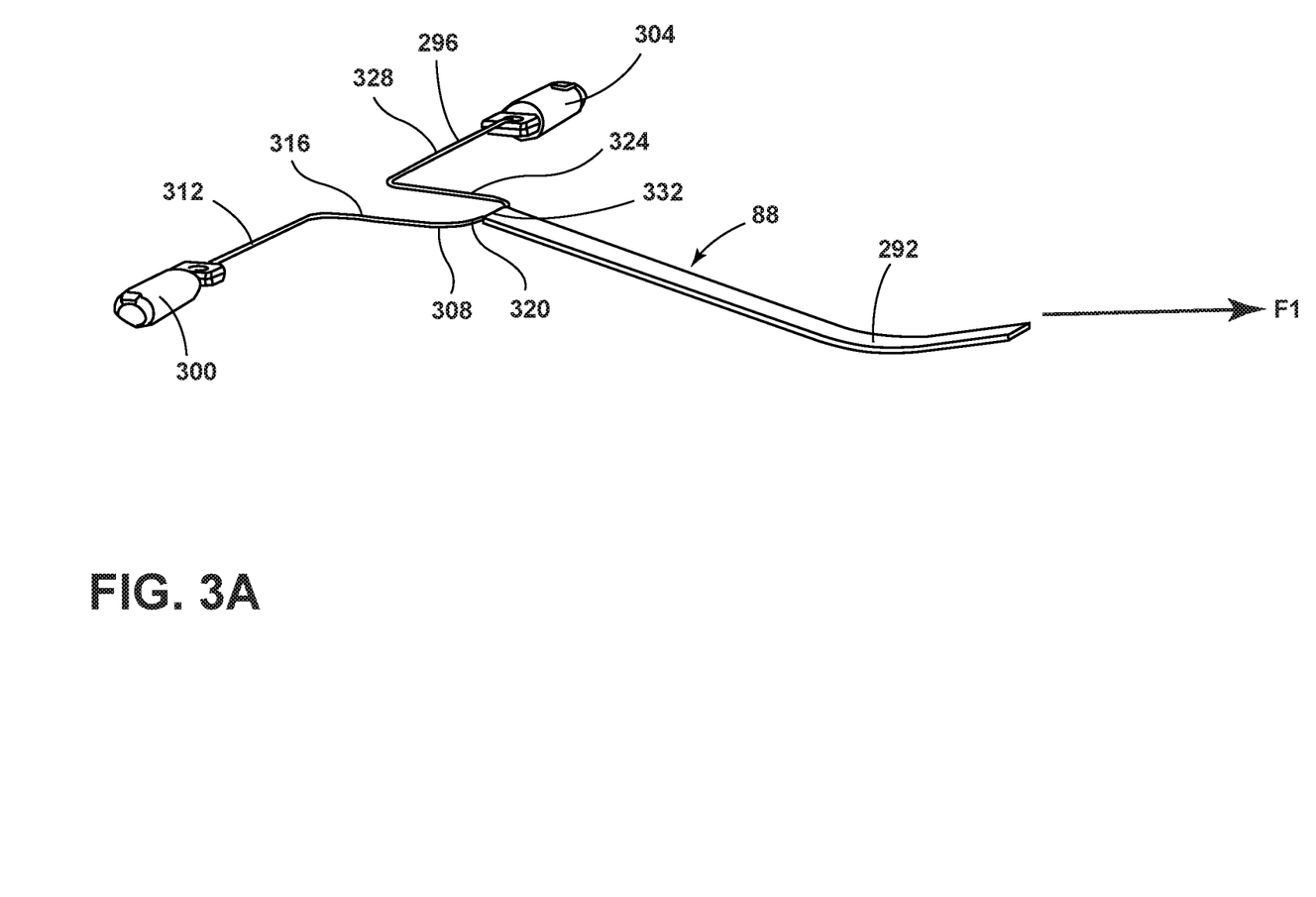
FIG. 3A is a front perspective view of the retention assembly, according to an embodiment.

With reference to FIG. 3A, the retention assembly 88 is shown disengaged from the second bracket assembly 18. The retention assembly 88 may include an activation strap 292, a cable 296, a first extension member 300 and a second extension member 304. A protrusion 308 may be located in a center area of the cable 296. The protrusion 308 may be U-shaped. The cable 296 may include a first segment 312, a second segment 316, a third segment 320, a fourth segment 324, and a fifth segment 328. The second segment 316, the third segment 320, and the fourth segment 324 may form the protrusion 308. The first segment 312 may be connected to the first extension member 300. The fifth segment 328 may be connected to a second extension member 304. The protrusion 308 may provide an attachment area 332 for the activation strap 292. A force F1 may be exerted on the strap to move the retention assembly 88 between the locking position XXX (FIG. 15) and the unlocking position XXXV (FIG. 18).

Figure 4:
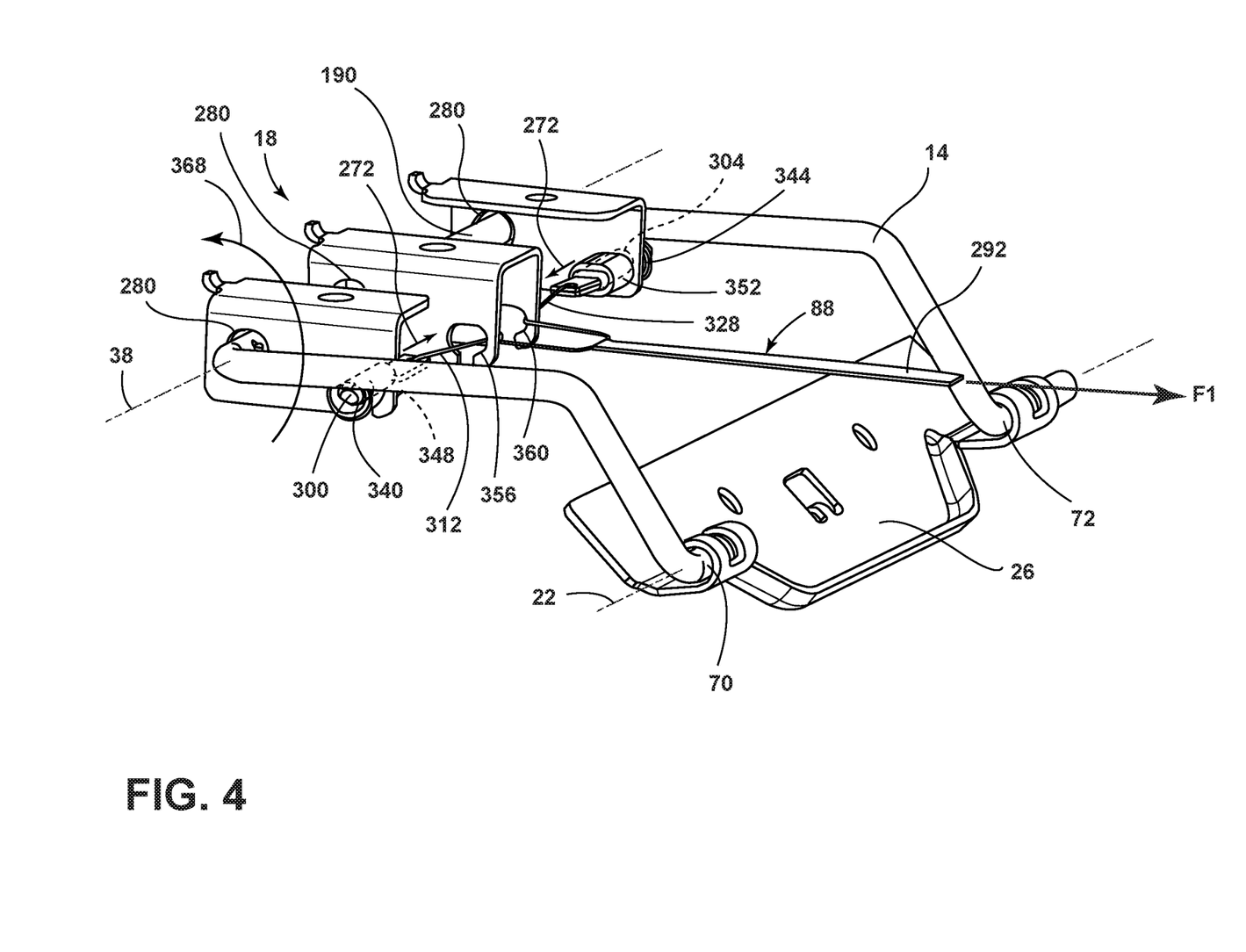
FIG. 4 is a front perspective view of the hinge assembly of FIG. 3 with extension members in retracted positions, according to an embodiment.

With reference to FIG. 4, the second bracket assembly 18 may be configured to receive the retention assembly 88. The first extension member 300 may be mounted in a first aperture 340 of the second bracket assembly 18. The second extension member 304 may be mounted in a second aperture 344 of the second bracket assembly 18. In various aspects of the disclosure, first and second bushings 348, 352 or other mounting structures, may be disposed in the first and second apertures 340, 344 to help mount the retention assembly 88 to the second bracket assembly 18. The first segment 312 of the cable 296 may extend through a first cutaway portion 356 in the second bracket assembly 18. The fifth segment 328 of the cable 296 may extend through a second cutaway portion 360 in the second bracket assembly 18. Arrows 272 show the directions in which the first and second extension members 300, 304 may move when force F1 is exerted on the activation strap 292.

With continued reference to FIG. 4, a first axis 22 may extend through the first and second cavities 70, 72 of the first bracket 26. The link 14 may be pivotable about the first axis 22. A second axis 38 may extend through the holes 280 of the second bracket assembly 18. The second bracket assembly 18 and the seat 42 (not shown) may be pivotable about the connection member 190 of the link 14 that extends through the second bracket assembly 18. The retention assembly 88, which may be attached to the second bracket assembly 18, may be pivotably coupled to the second axis 38.

Figure 5:
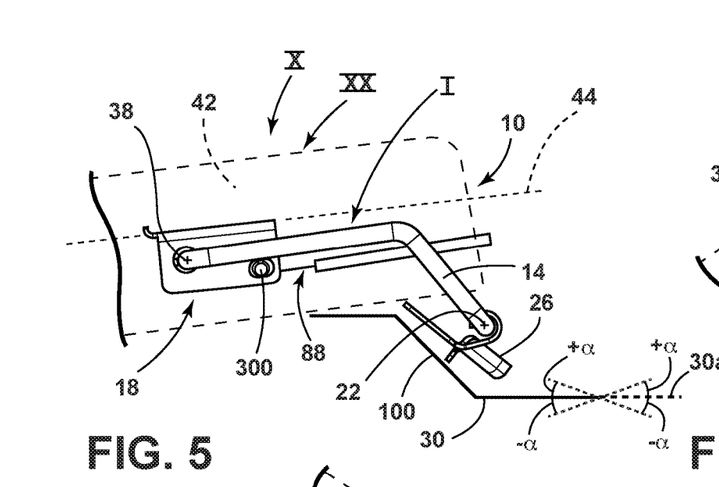
FIG. 5 is a side view of the hinge assembly with the first pivoting member in a first position and the second pivoting member in a fixed position, according to an embodiment.
Figure 6:
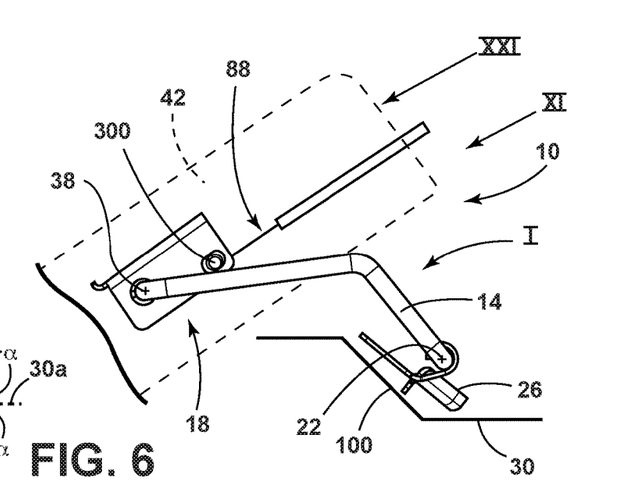
FIG. 6 is a side perspective view of the hinge assembly with the first pivoting member in a first position and the second pivoting member in a released position, according to an embodiment.
Figure 7:
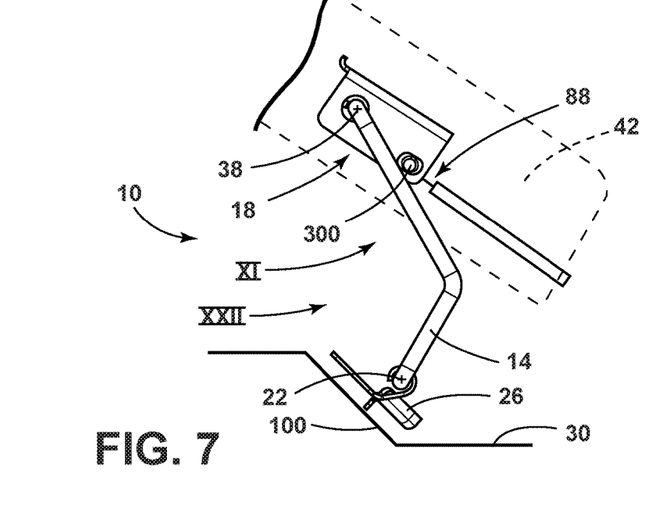
FIG. 7 is a side perspective view of the hinge assembly with the first pivoting member in an intermediate position and the second pivoting member in the released position, according to an embodiment.
Figure 8:
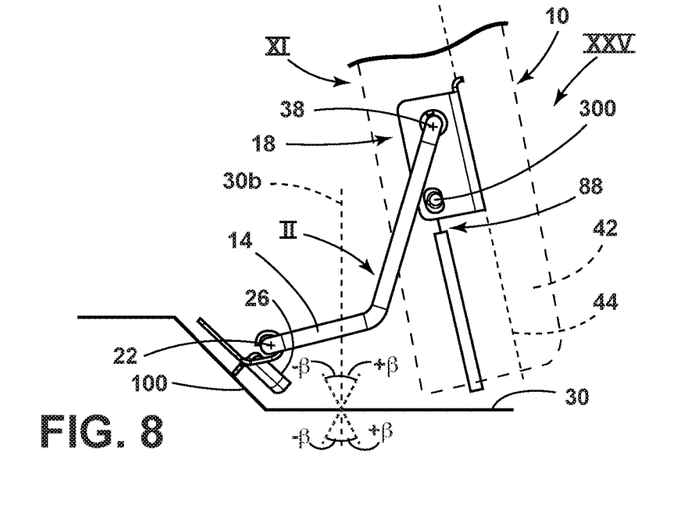
FIG. 8 is a side perspective view of the hinge assembly with the first pivoting member in the second position and the second pivoting member in the released position, according to an embodiment.

With reference to FIGS. 5-8, four views of the hinge assembly 10 in various positions are shown. A cutaway view of a seat 42 is shown disposed on the second bracket assembly 18 of the hinge assembly 10. As previously discussed, fasteners may secure the seat 42 to the second bracket assembly 18. The link 14 may be pivotable about the first axis 22 between at least a first position I (FIG. 5) and a second position II (FIG. 8). The second bracket assembly 18 may be pivotable about the second axis 38 between at least a fixed position X (FIG. 5) and a released position XI (FIGS. 6, 7, and 8). The seat 42 may be selectively positionable between a substantially horizontal position XX (FIG. 5), a first intermediate position XXI (FIG. 6), a second intermediate position XXII (FIG. 7), and a substantially vertical position XXV (FIG. 8).

Referring to FIG. 5, the hinge assembly 10 is shown with the first pivoting member (link 14) in the first position I and the second pivoting member (second bracket assembly 18) in the fixed position X. The seat 42 is shown in a substantially horizontal position XX. The term substantially horizontal position XX may refer to a displacement of the seat orienting line 44 in the approximate range of approximately −20° (−α) to approximately +20° (+α) from a substantially horizontal line 30a.

With reference to FIG. 6, the first pivoting member (link 14) is shown in the first position I. The second pivoting member (second bracket assembly 18) is shown in the released position XI. The seat 42 is shown in a first intermediate position XXI.

Referring to FIG. 7, the first pivoting member (link 14) is shown in a transitional position between the first position I (FIGS. 5 and 6) and a second position II (FIG. 8). The second pivoting member (second bracket assembly 18) is shown in the released position XI. The seat 42 is shown in a second intermediate position XXII.

With reference to FIG. 8, the first pivoting member (link 14) is shown in the second position II and the second pivoting member (second bracket assembly 18) is shown in the released position XI. The seat 42 is shown in the substantially vertical position XXV. The term substantially vertical position XXV may refer to a displacement in the approximate range of approximately −20° (−β) to approximately +20° (+β) from a substantially vertical line 30b.

As such, FIGS. 5-8 show movement of a seat 42 from a substantially horizontal position XX (FIG. 5) to a substantially vertical position XXV (FIG. 8) to provide for storage space between the seatback 74 and the seat 42 in the substantially vertical position XXV. A suitcase 84 or other cargo item may be stored between the seatback 74 and the seat 42 in the substantially vertical position XXV. See, FIG. 14. In the event of a front impact collision (represented by arrow 92 in FIG. 1), the second bracket assembly 18 in the fixed position X may restrain the seat 42 from rotating around the second axis 38.

Figure 9:
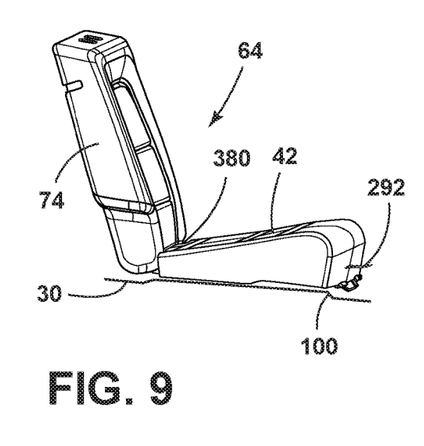
FIG. 9 is a perspective view of a seating assembly, according to an embodiment.
Figure 10:
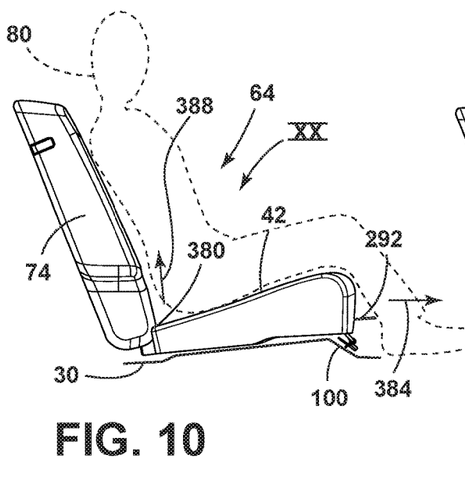
FIG. 10 is a side view of the seating assembly of FIG. 9 with a seat in a substantially horizontal position, according to an embodiment.

Referring now to FIGS. 9-14, various configurations of a seating assembly 64 containing a hinge assembly 10 are shown. FIG. 9 shows a perspective view of the seating assembly 64. FIG. 10 shows a side view of the seating assembly 64 of FIG. 9. The seatback 74 and the seat 42 may form a bite line 380 at the interface of the seatback 74 and the seat 42. A tight fit between the seatback 74 and the seat 42 may be formed at the bite line 380. During a front impact collision (represented by arrow 92 in FIG. 1), the tight fit between the seatback 74 and the seat 42 at the bite line 380 may help to prevent the seat 42 from moving. As previously explained, the retention assembly 88 for retaining the second bracket assembly 18 and the seat 42 attached to the link 14 in a fixed position X (FIG. 5) may also prevent the seat 42 from moving substantially during a front impact collision (represented by arrow 92 in FIG. 1). With continued reference to FIG. 10, a forward facing arrow 384 shows the direction an individual 80 may move the seat 42, and an upward facing arrow 388 shows the direction an individual 80 may move the seat 42.

Figure 11:
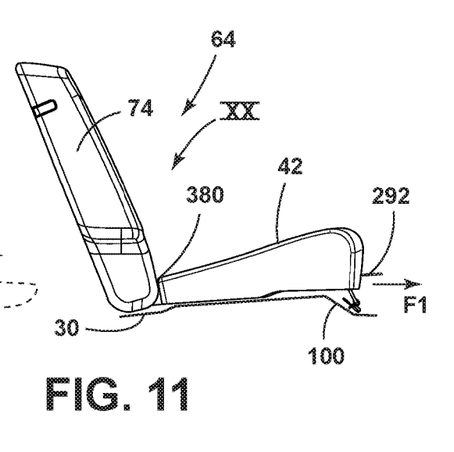
FIG. 11 is a side view of the seating assembly of FIG. 10 with a seat moved forward and upward relative to the position of the seat in FIG. 10, according to an embodiment.
Figure 12:
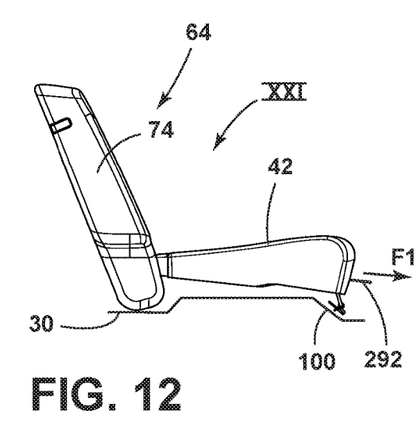
FIG. 12 is a side view of the seating assembly of FIG. 11 with a seat in a first intermediate position, according to an embodiment.
Figure 13:
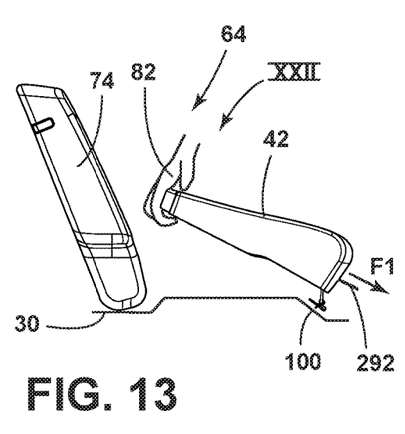
FIG. 13 is a side view of the seating assembly of FIG. 11 with a seat in a second intermediate position, according to an embodiment.
Figure 14:
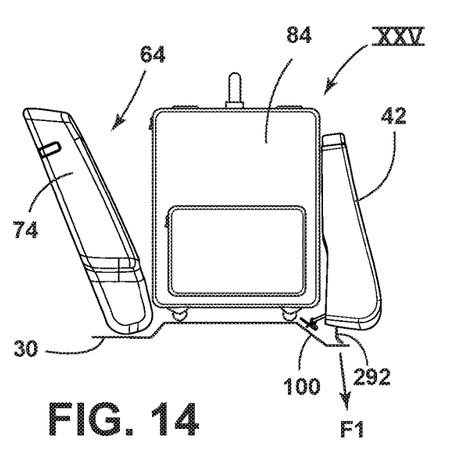
FIG. 14 is a side view of the seating assembly of FIG. 11 with a seat in a substantially vertical position, according to an embodiment.

With reference to FIG. 11, the seat 42 of FIG. 10 is shown after it has been moved in the directions shown by the forward facing arrow 384 and the upward facing arrow 388. FIG. 11 shows the seat 42 in a substantially horizontal position XX. FIG. 12 shows the seat 42 in a first intermediate position XXI. FIG. 13 shows the seat 42 in a second intermediate position XXII. FIG. 14 shows the seat 42 in a substantially vertical position XXV. An individual may move the seat from the substantially horizontal position XX (FIG. 10) to the substantially vertical position XXV (FIG. 14) by exerting force F1 on the activation strap 292. Also, in addition to the exertion of a force F1 on the activation strap 292, an individual may use a hand 82 (FIG. 13) to rotate or otherwise move the seat 42 between the substantially horizontal position XX (FIG. 10) and the substantially vertical position XXV (FIG. 14). A suitcase 84 is shown disposed between the seatback 74 and the seat 42 in the substantially vertical position XXV. To move the seat 42 from the substantially vertical position XXV (FIG. 14) to the substantially horizontal position XX (FIG. 10), the seat 42 may be sequentially moved through the positions shown in FIGS. 14, 13, 12, 11, and 10.

Referring to FIGS. 15 to 18, operation of the retention assembly 88 is discussed with reference to the first extension member 300. The first extension member 300 of the retention assembly 88 is shown moving between a locking position XXX (FIG. 15) and an unlocking position XXXV (FIG. 18).

Figure 15:
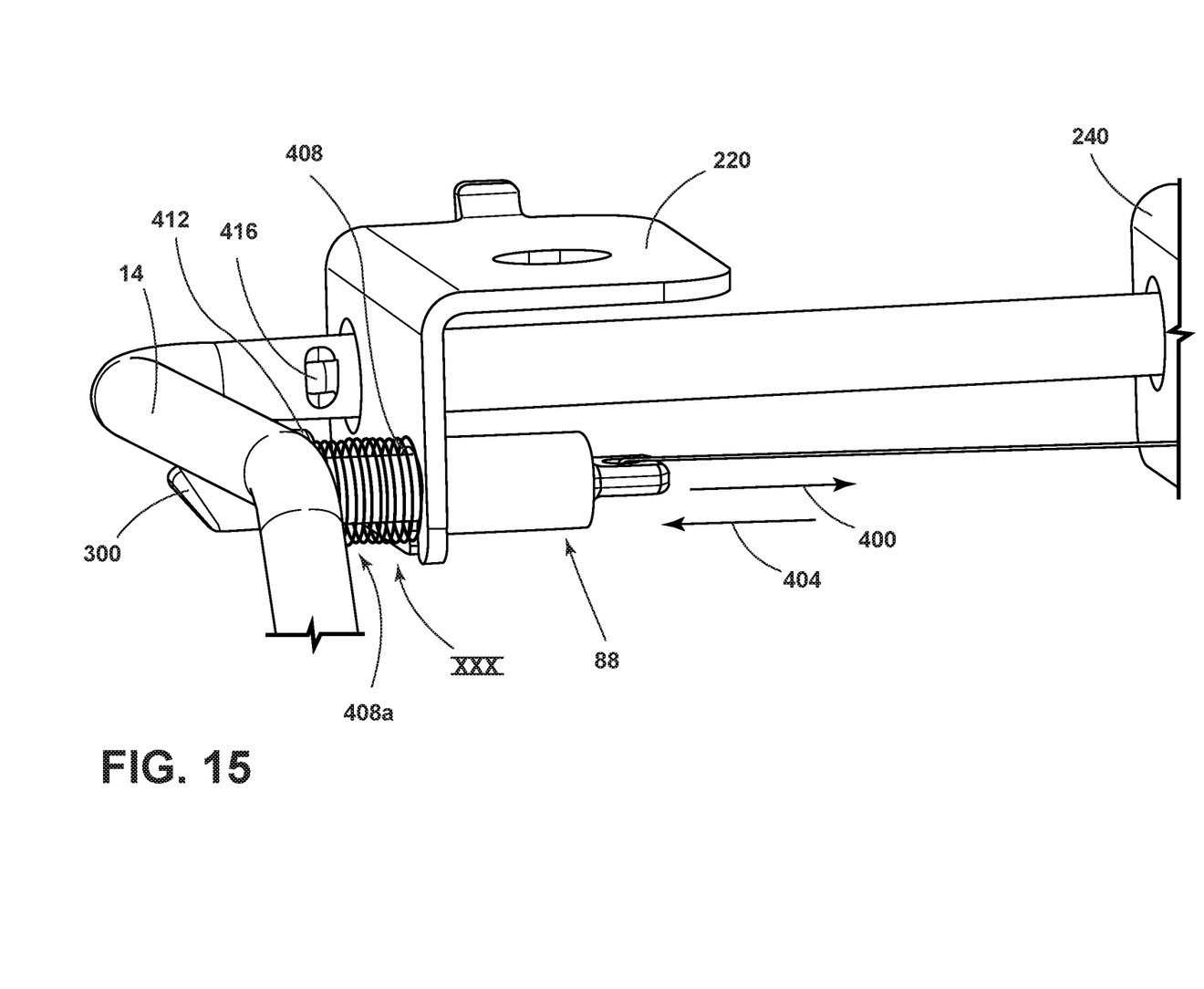
FIG. 15 is a perspective view of a first extension member of the retention assembly in a locking position, according to an embodiment.
Figure 17:
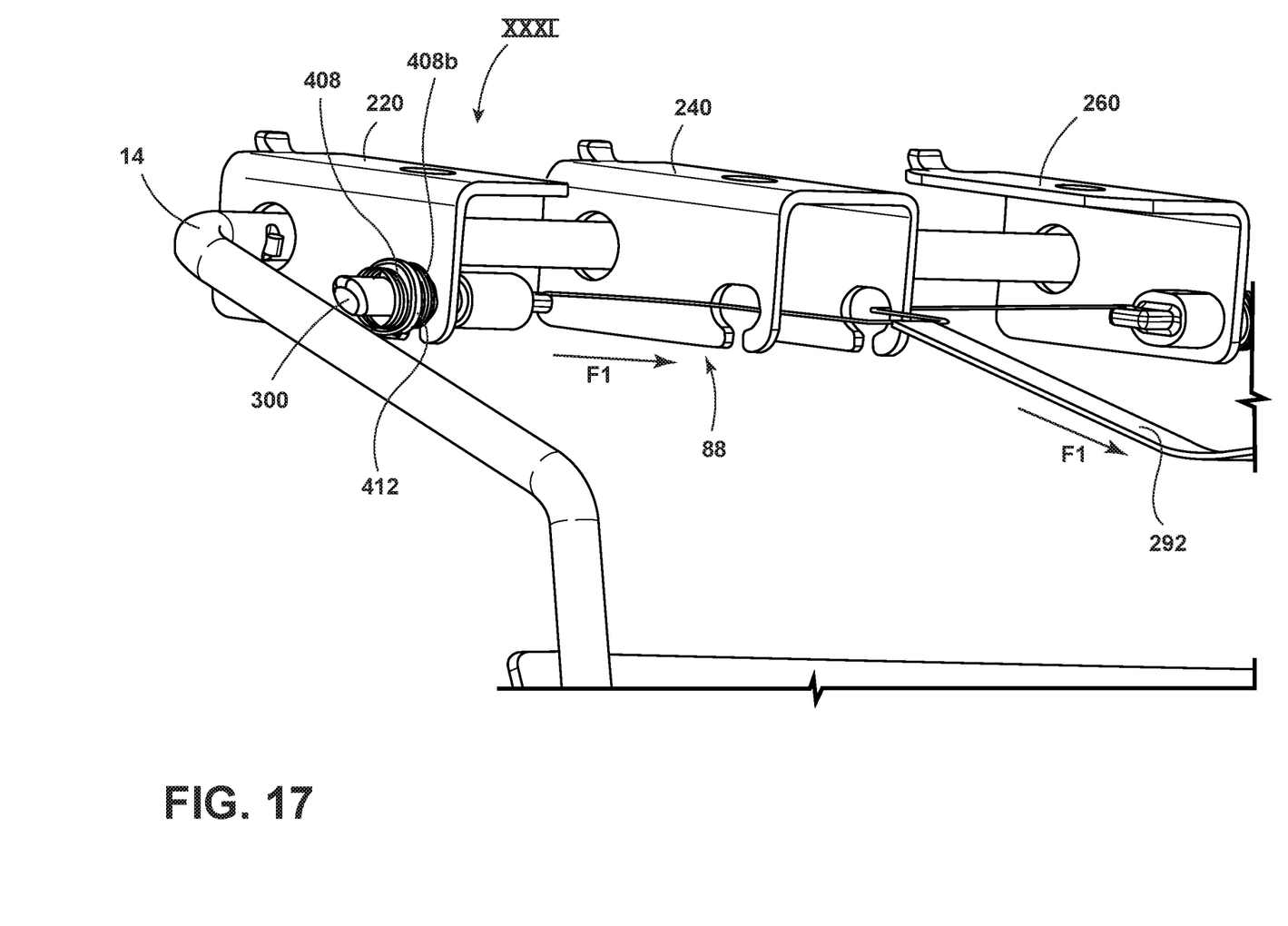
FIG. 17 is a front perspective view of a first extension member of the retention assembly in an adjustment position, according to an embodiment.

With reference to FIG. 15, the first extension member 300 is shown in a locking position XXX. Arrow 400 shows the direction of movement of the first extension member 300 when a first force F1 is applied to the cable 296 by pulling on an activation strap 292 (FIG. 17). Arrow 404 shows the direction of movement of the first extension member 300 when a second force F2 is applied to the first extension member 300 by a biased spring 408 moving from a compressed state 408b (FIG. 17) to an extended state 408a. The biased spring 408 may be mounted on a collar 412 (FIG. 17) that may encircle the first extension member 300. The link 14 may include a tab 416 that may minimize lateral movement of the second bracket assembly 18. The first extension member 300 is shown in the locking position XXX in FIG. 15. The locking position XXX may be referred to as an extended position of the first extension member 300.

Figure 16:
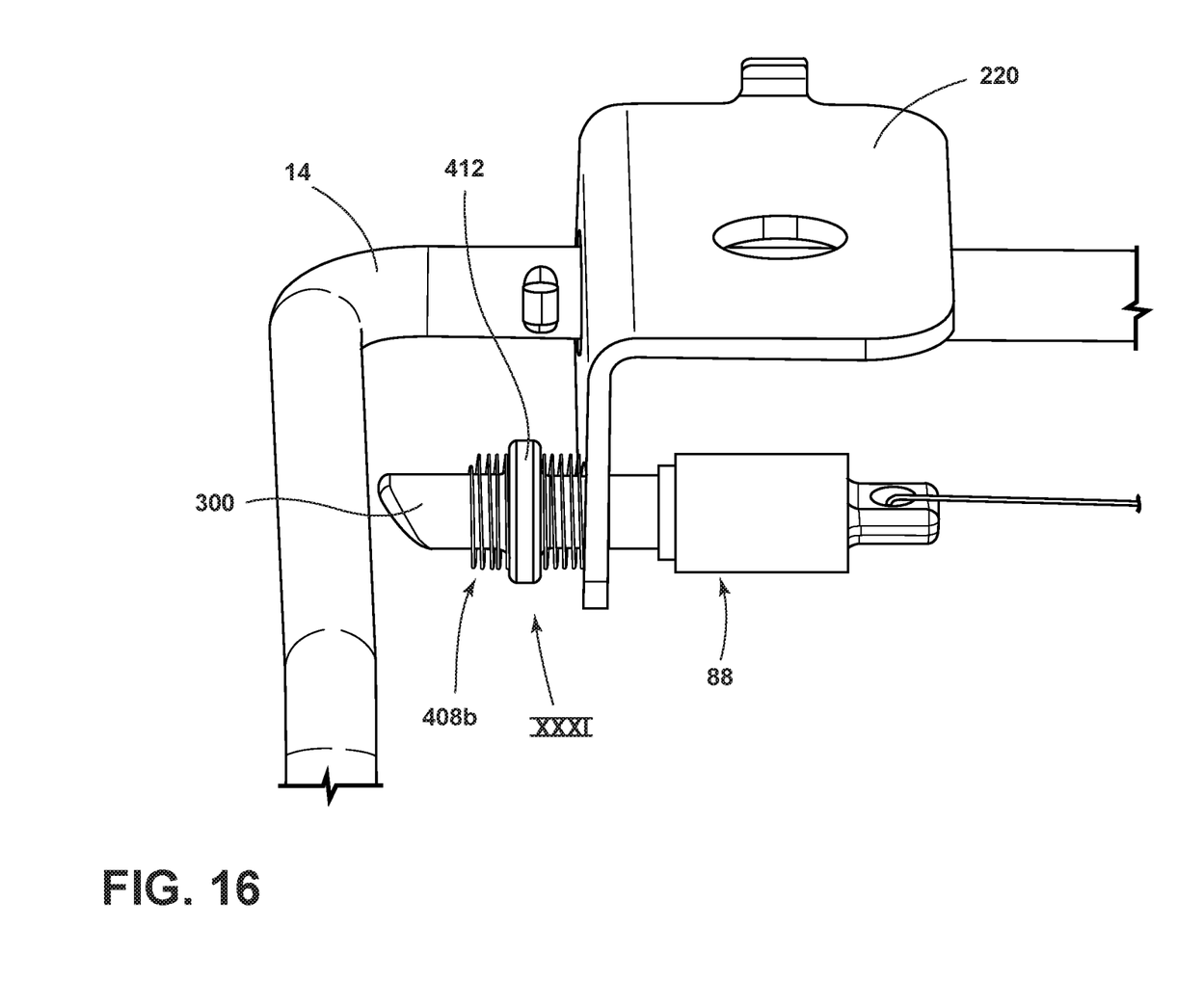
FIG. 16 is a front elevational view of a first extension member of the retention assembly in an adjustment position, according to an embodiment.

Referring to FIG. 16, the first extension member 300 is shown in an adjustment position XXXI. An adjustment position XXXI may be a position between the locking position XXX and the unlocking position XXXV. An adjustment position XXXI may include the first extension member 300 in a retracted position. The spring 408 disposed around the first extension member 300 is shown in a compressed state 408b in the retracted position of the first extension member 300.

Referring to FIG. 17, another view of the first extension member 300 in the adjustment position XXXI is shown. The adjustment position XXXI shown includes a retracted position of the first extension member 300. An activation strap 292 may be actuated to exert a force F1 on the first extension member 300 and the second extension member 304 (not shown).

FIG. 18 shows the first extension member 300 in the unlocking position XXXV. In the unlocking position XXXV, the first extension member 300 is in an extended position.

Figure 19:
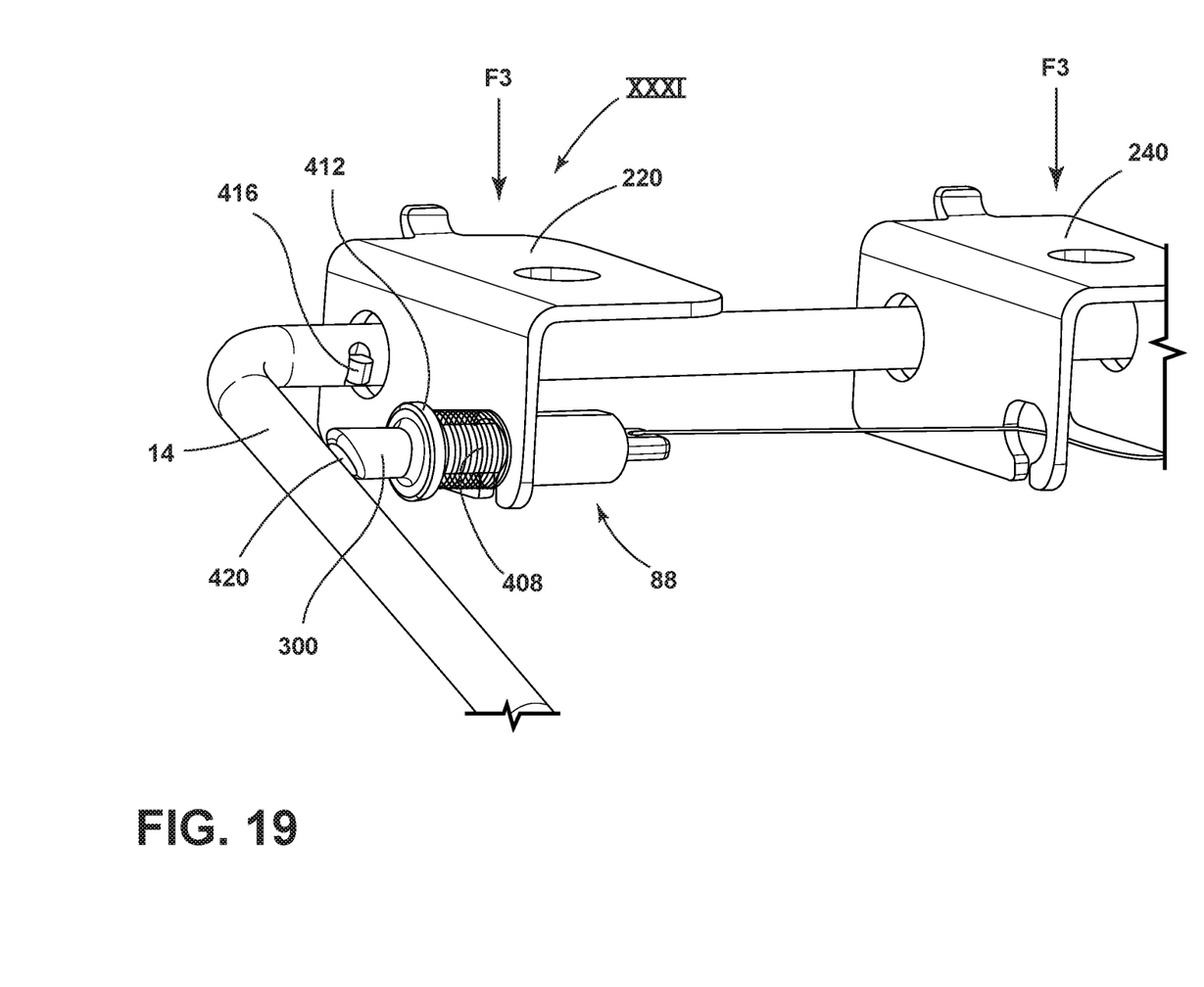
FIG. 19 is a perspective view of a first extension member of the retention assembly in an adjustment position, according to an embodiment.

Referring to FIG. 19, the first extension member 300 is again shown in an adjustment position XXXI between an unlocking position XXXV and a locking position XXX. A downward force F3 may be exerted on the first, second, and third parts 220, 240, 260 (not shown) of the second bracket assembly 18. In the configuration of the hinge assembly 10 shown in FIG. 3, the force F3 may be a downward force. In various other configurations of the hinge assembly 10, the force F3 may be a downward force or a force directed in another direction. The force F3 may cause the first extension member 300 to retract to an adjustment position XXXI until the first extension member 300 clears the link 14 and extends to the locking position XXX due to a force F2 (FIG. 18) exerted by the spring 408. The first extension member 300 may include a slanted end 420 that may facilitate downward movement of the first extension member 300 from an unlocking position XXXV to a locking position XXX in response to the force F3 exerted on the first, second, and third parts 220, 240, 260 (not shown) of the second bracket assembly 18.

With reference to FIGS. 15-19 and the discussion of FIGS. 15-19 above, although the first extension member 300 has been shown and described, it should be appreciated that the discussion related to the first extension member 300 may also apply to the second extension member 304 and to the generally simultaneous operation of the first and second extension members 300, 304 as part of the retention assembly 88.

With reference to FIGS. 1-19, a hinge assembly 10 for a vehicle seat 42 may include first and second mounting mechanisms (e.g., first bracket 26 and second bracket assembly 18) secured to a vehicle floor 30 and a seat 42, respectively. A link 14 may extend between the first and second mounting mechanisms. The seat 42 may be rotatable about a second axis 38 defined by the link 14 and extending through the second mounting mechanism. The second mounting mechanism and the seat 42 may be rotatable about the second axis 38 between a fixed position X and a released position XI. In one example, the fixed position X may be a substantially horizontal position XX of the seat 42. In one example, the released position may be an inclined position (e.g., first intermediate position XXI or second intermediate position XXII) of the seat 42. The link 14 may define a first axis 22. The link 14 may extend through the first mounting mechanism. When the second mounting mechanism and the seat 42 are in an inclined position, then the second mounting mechanism and the seat 42 may be rotated around the first axis 22 to a substantially vertical position XXV of the seat 42 and the second mounting mechanism.

With reference to FIGS. 1-19, a vehicle seat hinge assembly 10 may include a linkage (e.g., link 14). The linkage may include a first portion 198 pivotally coupled to a vehicle floor 30 and a second portion 202 pivotally coupled to a vehicle seat 42. A retention assembly 88 may be coupled to a vehicle seat 42. The retention assembly 88 may be engageable with the linkage. The retention assembly 88 may be selectively positionable between a locking position XXX and an unlocking position XXXV to retain the vehicle seat 42 in a respective fixed position X or a released position XI.

A variety of advantages may be derived from use of the present disclosure. A hinge assembly 10 may provide for convenient movement of a seat 42 from a substantially horizontal position XX to a substantially vertical position XXV. When the seat 42 is in the substantially vertical position XXV, a suitcase 84 or other cargo may be stored between the seat 42 in the substantially vertical position XXV and the seat 42. The hinge assembly 10 may also allow for maintenance of the seat 42 in a fixed position X during a front impact (as represented by arrow 92 in FIG. 1). Maintenance of the seat 42 in a fixed position X during front vehicle impact (as represented by arrow 92 in FIG. 1) may provide for increased safety in the vehicle cabin 60.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat hinge assembly comprising:
   a link defining a first axis and coupled to a first bracket disposed on a vehicle floor;
   a second bracket assembly defining a second axis and disposed on a seat, wherein the link is pivotable about the first axis between at least first and second positions, and wherein the second bracket assembly is pivotable about the second axis between at least fixed and released positions; and
   a retention assembly coupled to the second bracket assembly and positionable in a locking position or an unlocking position relative to the link and including:
   two extension members movable between extended and retraced positions and transverse to the link, wherein in the locking position, the second bracket assembly is in a fixed position and the extension members are positionable on a first side of the link, and wherein in the unlocking position, the second bracket assembly is in a released position and the extension members are positionable on a second side of the link.

2. The vehicle seat hinge assembly of claim 1, wherein the link includes a continuous U-shaped rod.

3. The vehicle seat hinge assembly of claim 1, wherein the vehicle floor includes an inclined portion and wherein the first bracket is mounted to the inclined portion of the vehicle floor.

4. The vehicle seat hinge assembly of claim 3, wherein the second bracket assembly is disposed in a recess in the seat.

5. The vehicle seat hinge assembly of claim 1, wherein the first side of the link includes a location below the link when the seat is in a substantially horizontal position.

6. The vehicle seat hinge assembly of claim 1, wherein the second side of the link includes a location above the link when the seat is in the substantially horizontal position.

7. The vehicle seat hinge assembly of claim 1, wherein the link includes a pair of opposing legs disposed on opposing sides of the first and second brackets and extending between the first and second brackets and wherein each of the opposing legs of the pair of opposing legs includes an obtuse bend angle.

8. The vehicle seat hinge assembly of claim 7, wherein the pair of opposing legs each include a segment coupled to the first bracket and defining the first axis of rotation.

9. The vehicle seat hinge assembly of claim 1, wherein the link includes a pair of opposing legs extending between the first bracket and the second bracket and wherein the two extension members are positionable on the first side of each of the respective legs when the retention assembly is in the locking position and positionable on the second side of each of the respective legs when the retention assembly is in the unlocking position.

10. The vehicle seat hinge assembly of claim 9, comprising:
    a cable disposed between the two extension members, wherein a force applied to the cable in a direction substantially parallel to the pair of opposing legs moves the two extension members between the locking position and the unlocking position.

11. The vehicle seat hinge assembly of claim 10, wherein the two extension members are transverse to the pair of opposing legs.

12. The vehicle seat hinge assembly of claim 1, wherein the second bracket assembly includes a plurality of parts.

13. The vehicle seat hinge assembly of claim 1, wherein the second bracket assembly includes a unitary part.

14. A hinge assembly for a vehicle seat comprising:
    first and second mounting mechanisms secured to a floor and a seat, respectively;
    a U-shaped link extending between the first and second mounting mechanisms and including:
    opposing first and second legs disposed along opposing sides of the seat; and a retention assembly including:
    opposing first and second extension members disposed transverse to each of the respective opposing first and second legs, wherein the second mounting mechanism and the seat are rotatable about a second axis defined by the U-shaped link and extending through the second mounting mechanism between fixed and released positions, and wherein the opposing first and second extension members move between extended and retracted positions to move the second mounting mechanism and the seat between the fixed and released positions.

15. The hinge assembly for a vehicle seat of claim 14, wherein the opposing first and second extension members are mounted in bushings in the second mounting mechanism.

16. The hinge assembly for a vehicle seat of claim 15, further comprising:

a cable extending between the opposing first and second extension members.

17. The hinge assembly for a vehicle seat of claim 14, wherein the opposing first and second extension members each include a biasing mechanism.

18. A vehicle seat hinge assembly comprising:
   a linkage comprising:
      a first portion pivotally coupled to a first bracket disposed on a vehicle floor;
      a second portion pivotally coupled to a second bracket assembly disposed on a vehicle seat; and
      a pair of opposing legs extending between the first bracket and the second bracket assembly; and
   a retention assembly coupled to the second bracket assembly, and engageable with the pair of opposing legs of the linkage, and including:
      a pair of opposing biased extension members; and
      a cable coupled to each of the pair of opposing biased extension members, wherein a force is applied to the cable to move the pair of opposing biased extension members between locking and unlocking positions by moving the pair of opposing biased extension members between extended and retracted positions to retain the vehicle seat in respective fixed or released positions.

19. The vehicle seat hinge assembly of claim 18, wherein the linkage includes a U-shaped rod.

20. The vehicle seat hinge assembly of claim 19, further comprising:
   an activation strap coupled to the cable.

* * * * *